Dec. 22, 1970     C. J. EDWARDS     3,549,252
APPARATUS FOR MAKING OBLIQUE PRINTS FROM ORTHOGRAPHIC DRAWINGS
Filed May 31, 1968     4 Sheets-Sheet 1
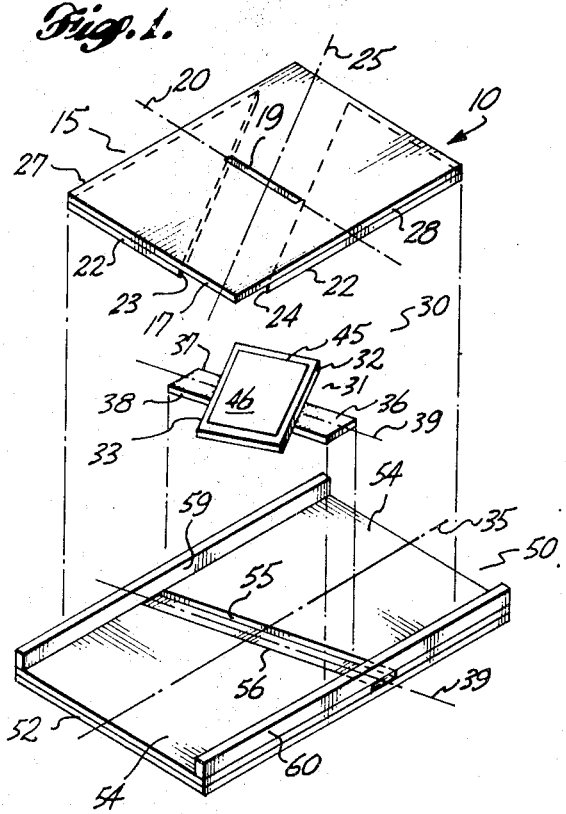
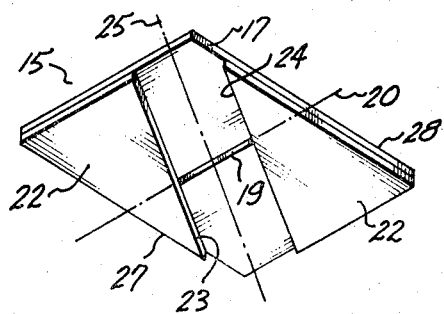
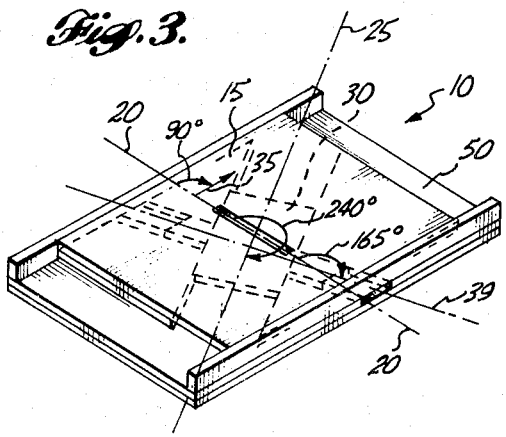
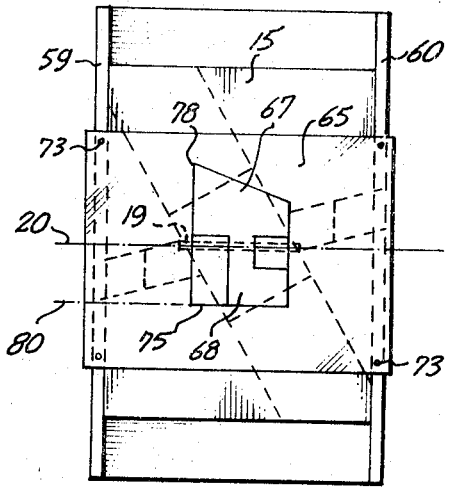
INVENTOR
CHARLES JOHN EDWARDS
BY
Christensen, Sanborn & Matthews
ATTORNEYS

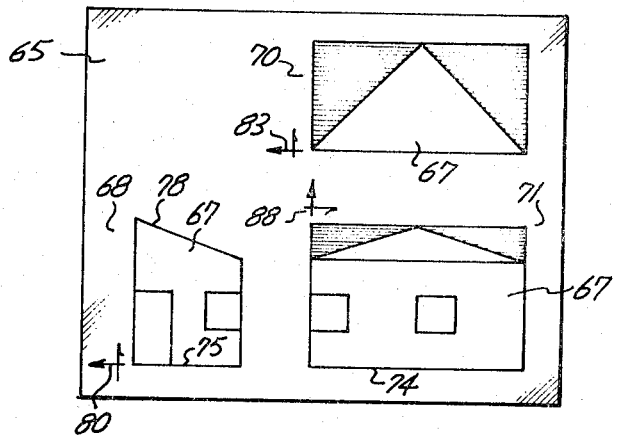
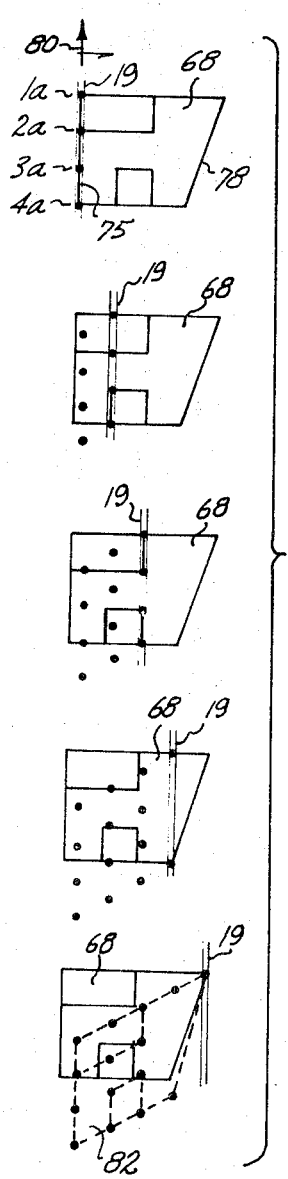
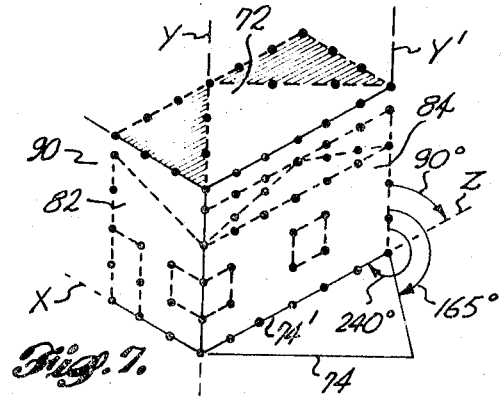

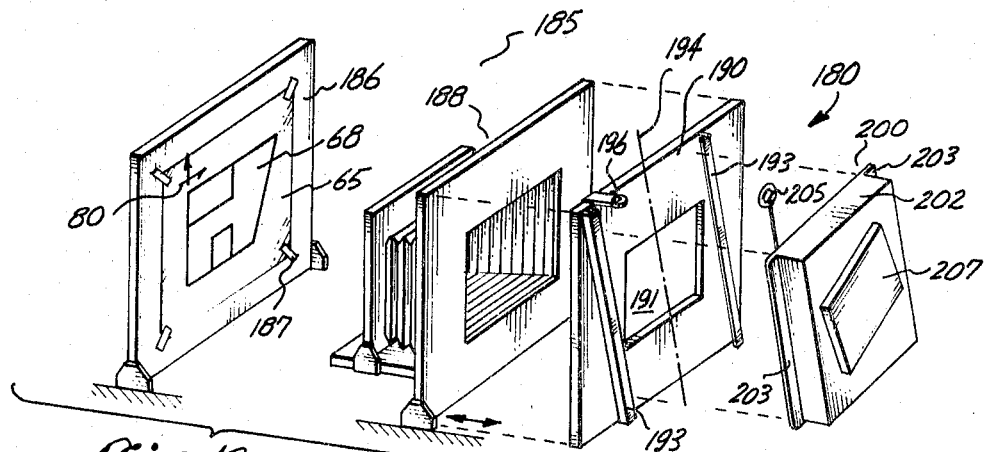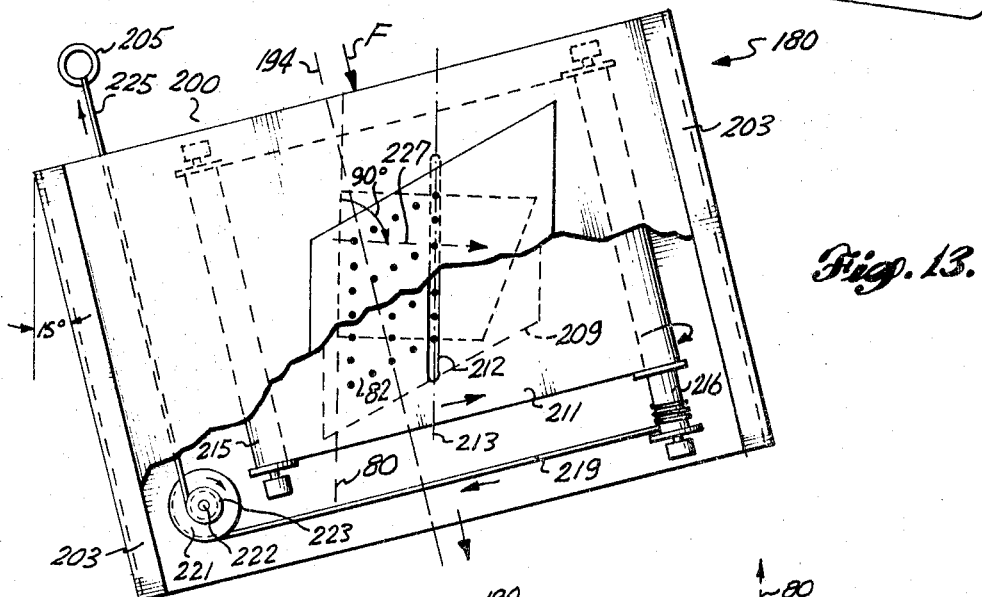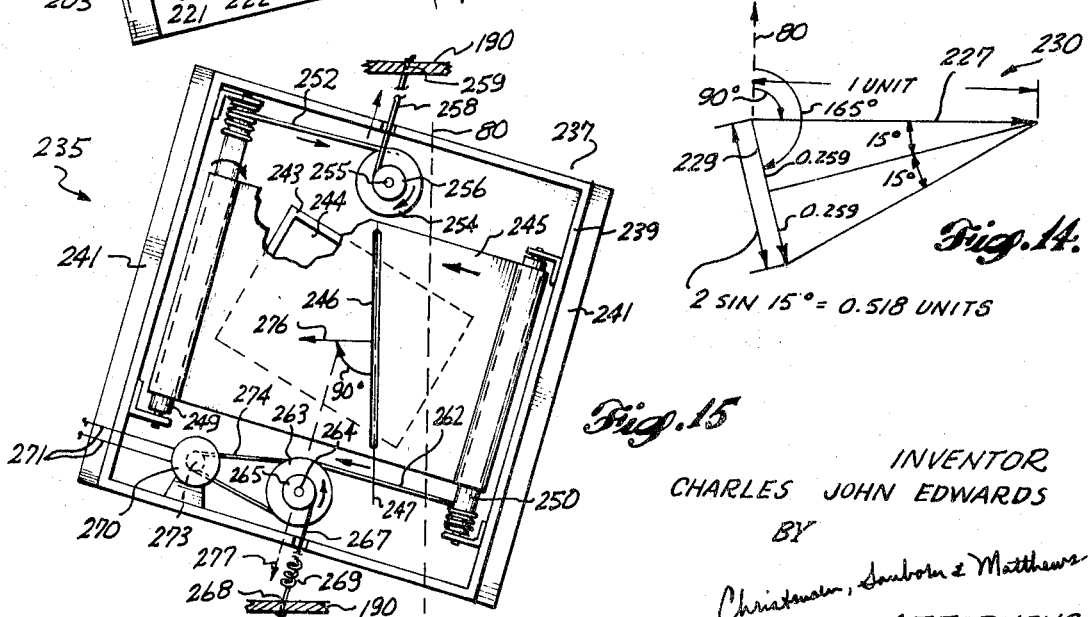

United States Patent Office

3,549,252
Patented Dec. 22, 1970

3,549,252
APPARATUS FOR MAKING OBLIQUE PRINTS FROM ORTHOGRAPHIC DRAWINGS
Charles John Edwards, Redmond, Wash., assignor to The Boeing Company, Seattle, Wash., a corporation of Delaware
Filed May 31, 1968, Ser. No. 733,384
Int. Cl. G03b 27/68
U.S. Cl. 355—52                    15 Claims

ABSTRACT OF THE DISCLOSURE

Equipment for converting orthographic drawings into oblique prints, so that from these prints isometric drawings can be developed with a significant saving of man hours. A masking member defining an elongated aperture slit having an axis is moved relative to a support structure such that its elongated aperture extends parallel to a first direction, while it is moved in a direction perpendicular to the first direction. An image sensitive member is supported by a carriage and placed adjacent to the masking member aperture. Interlocking motion and guide systems are provided to guide the movement of the image sensitive member in a path having a direction of 165° from the first direction as the masking means is moved relative to the support structure and the carriage is moved in a direction 240° relative to the axis of the aperture. The orthographic image, with one of its axis positioned to be parallel to the one direction, is projected through the aperture by suitable means such as an enlarger to focus on the plane of the sensitive member to form the oblique image.

CROSS-REFERENCE TO RELATED APPLICATION

While this application is directed to one type of apparatus for converting orthographic images into tracing guides for producing isometric drawings, another type of apparatus for the same purposes is disclosed and claimed in the copending application having a common assignee, Ser. No. 733,667, filed May 31, 1968 issued into Pat. No. 3,457,648 dated July 29, 1969, entitled "Isometric Drafting Converter."

BACKGROUND OF THE INVENTION

Field of the invention

This invention relates to an apparatus for producing oblique prints from orthographic drawings suitable for use as tracing guides for the preparation of isometric drawings.

Description of the prior art

Apparatus are known for producing oblique isometric guide prints from orthographic drawings, but such apparatus are rather complicated and therefore somewhat expensive and difficult to use. A good review of various recently developed systems and equipment for reducing the amount of time required to convert from orthographic drawings to axonometric drawings, such as isometric drawings, is published in a series of articles in the magazine Engineering Graphics. The first such article begins on page 6 of the November 1964 edition and describes the system more fully disclosed in U.S. Pat. No. 3,280,697 to Henley. A two-part article was published in the same magazine with the first installment beginning on page 6 of the December 1965 edition and the second installment beginning on page 12 of the January 1966 edition.

An early disclosure of interest is that included in the patent to Lotka No. 1,176,384 wherein a technique is described involving the utilization of an apertured slit for successively exposing selected portions of an original drawing onto a light-sensitive film. Certain distortions are possible using this equipment to change the lengths of certain lines in the drawing; either for shortening them or extending them, depending on the relative movement between the exposing slit and the original. This concept was improved upon in the patent to Kingsbury No. 1,906,973 by the utilization of an adjustable cam which translates a film holder in a direction parallel to the extension of an aperture slit defined in a moving masking plate. In Kingsbury distortions in the original drawing or photocopy are corrected by adjusting the position of the cam such that the film holder is moved vertically the proper amount as the slit is moved transversely during the exposure of a light-sensitive surface in a camera to minute elemental areas of the original picture.

The patent to Wilkinson 2,462,150 discloses one of the earliest apparatus for producing oblique projections useful as tracing guides for developing axonometric drawings from orthographic drawings. This apparatus includes the use of a slanted copy board for holding the original drawing which is incrementally exposed upon a film held in a vertical plane. The end result and the purpose of this technique and apparatus are to produce oblique prints, such as shown in FIG. 10 of the patent, suitable as tracing guides for the preparation of axonometric drawings.

Two other apparatus useful for producing distorted drawings from original drawings are those shown in FIGS. 1–14 and in FIG. 15 of the patent to Adams et al. 3,126,-809. As shown an apertured masking sheet is moved relative to a photosensitive plate as a light is projected through a transparent sheet upon which the negative of the drawing has been placed with the masking sheet placed between the negative and the sensitive film. A suitable motor means is used for producing the relative movement between the apertured slit and the film carrier.

OBJECTS AND SUMMARY OF THE INVENTION

It is therefore seen that various techniques and apparatus have been developed over the years for producing distorted images or for correcting distorted images. It should also become apparent, however, from a review of these various prior art techniques and apparatus that they are generally cumbersome in design or limited in their ability to produce any angular distortion such that they do not fill the need for a simple, inexpensive, yet accurate apparatus for producing oblique prints from orthographic engineering drawings. It is therefore the principal object of the instant invention to provide a generally improved apparatus for converting orthographic drawings into oblique prints useful as tracing guides for producing isometric drawings.

It is another object of the instant invention to provide an apparatus which will permit the use of microfilm cards as the input media for the orthographic projection and from this produce oblique prints suitable as guides for preparing isometric drawings.

Still another object of the instant invention is to provide a simple apparatus having the minimum number of parts, yet producing oblique prints from orthographic drawings, which is probably the most common form of drawings.

Another object of this invention is to provide an apparatus which may be attached to a copy camera for the purpose of converting orthographic drawings into tracing prints for the development of isometric drawing.

A related object of the instant invention is to provide an apparatus which is easy to fabricate and foolproof in its operation to provide a number of years of accurate service in performing the function of converting orthographic drawings into oblique prints suitable as tracing guides for the development of isometric drawings.

A still further object of the instant invention is to provide an apparatus of simple design which can be used to convert orthographic representations to oblique prints without necessarily requiring the use of a film or other light-sensitive impression media.

The present invention relates to an improved apparatus for converting orthographic drawings into oblique prints having the proper angular and length distortions required for preparation from them of isometric drawings.

In accordance with the present invention, a careful and exact movement relationship is established between the three major components of the converter. The first component is a masking member having defined in it a narrow elongated aperture slit with an axis which is positioned generally parallel to a selected axis of the orthographic drawing. The masking member is supported by and guided along a support structure with a relative movement between the aperture slit and the support structure established in a direction generally normal to the selected orthographic axis. Positioned adjacent to the masking member is an impression member including an impression sensitive surface which is incrementally exposed by the aperture defined in the masking member and supported by a carriage member. Interrelated guide and motion means are provided to guide the impression carriage in a path having an angle of 165° from the selected orthographic axis while the carriage moves in a direction extending 240° relative to the axis of the aperture slit.

As the masking member is moved relative to the support structure and impression member, the image of the orthographic drawing is projected by suitable means through the aperture slit making an impression on the sensitive surface of the impression member. Due to the predetermined relative movements between the various components, the resulting distorted oblique print sensed by the impression member is a suitable image from which an isometric drawing can be traced.

These and other objects, features and advantages of the invention will become more clearly apparent from the following detailed description thereof, which is to be read with reference to the accompanying drawings.

BRIEF DESCRIPTION OF THE DRAWINGS

FIG. 1 is an exploded isometric view illustrating the major components of the first embodiment of the converting apparatus made in accordance with the instant invention;

FIG. 2 is an isometric view illustrating the underside of the masking member used in the converting apparatus shown in FIG. 1;

FIG. 3 is an isometric view of the first embodiment illustrating the position of its components when assembled;

FIG. 4 is a plan view of the first embodiment illustrating the positioning of an orthographic drawing on the first embodiment converting apparatus made in accordance with the instant invention;

FIG. 5 illustrates a typical orthographic drawing showing three views of a building;

FIG. 6 illustrates the sequence of producing an oblique print utilizing the front view of the building shown in FIG. 5 in the first embodiment converting apparatus.

FIG. 7 illustrates the arrangement of oblique prints of the three views shown in FIG. 5 positioned for use as tracing guides to produce an isometric drawing;

FIG. 8 illustrates a typical isometric view which has been prepared by tracing the oblique prints of FIG. 7;

FIG. 12 is an exploded isometric view illustrating the major components of the fourth embodiment of the converting apparatus useful in a copy camera and made in accordance with the instant invention;

FIG. 13 is an end elevation view with some parts cut away for clarity of the film carriage used in the embodiment shown in FIG. 12;

FIG. 14 is a vector diagram illustrating the interrelation of certain parts of the converter made in accordance with the instant invention; and FIG. 15 is an end elevation view of a fifth embodiment of a masking assembly useful in the embodiment shown in FIG. 12.

DESCRIPTION OF THE PREFERRED EMBODIMENTS

Figure 9:
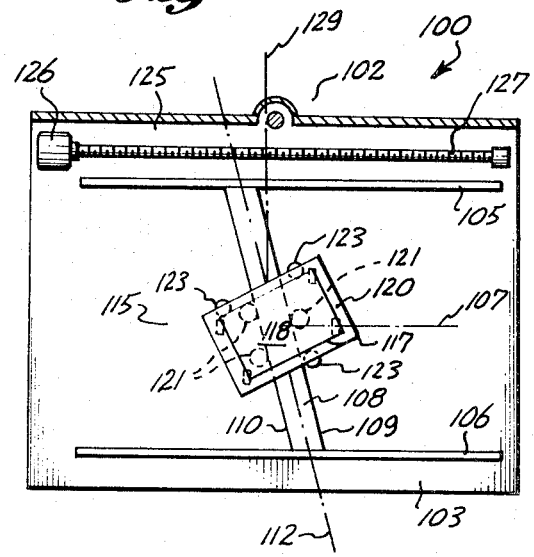
FIG. 9 is a plan view of the second embodiment of the converting apparatus of the instant invention with the masking member removed for clarity.

In the first embodiment 10 of the present invention, as shown in FIGS. 1–4, oblique prints are generated by means of a simple three-component apparatus. These components comprise an apertured masking member 15, an impression member 30, placed between the masking member 15 and the support structure 50.

Masking member 15 is composed of a top plate 17 having defined therein an elongated transparent slit or aperture 19 having a slit axis 20. As best shown in FIG. 2, guide plates 22 are secured to the underside of top plate 17 to establish a carriage guide path having an axis 25 and as defined by carriage guide edges 23 and 24 on opposite inward facing edges of guide plates 22. Masking member 15 has masked edges 27 and 28 which cooperate with support structure 50 to guide the movement of masking member 15 relative to support structure 50.

Impression member 30 is positioned between masking member 15 and support structure 50 and includes a carriage 31 for supporting impression sensitive member 45 with its impression surface 46 exposed to the transparent slit or aperture 19 of the masking member 15. To provide the proper relative movement between the masking member 15 and the impression member 30, carriage 31 includes guide edges 32 and 33 which are spaced generally parallel to one another having a distance of separation approximately equal to the distance separating carriage guide edges 23 and 24 established by the guide plates 22 of masking member 15. To provide relative movement between impression member 30 and support structure 50, impression carriage 31 also includes a guide tongue 36 having edges 37 and 38 which are parallel to tongue path axis 39.

Support structure 50 includes a bottom plate 52 supporting two upper plates 54 which define the tongue guide path 39 by their opposed and spaced apart inner edges to be referred to as tongue guide edges 55 and 56. Tongue guide edges 55 and 56 are spaced a distance substantially equal to the width of guide tongue 36 of impression member 30 providing a tongue path along tongue axis 39 for the relative movement between impression member 30 and support structure 50. Also included in the support structure 50 are mask panel guide plates 59 and 60 which are spaced apart and generally parallel to one another as well as being parallel to mask edges 27 and 28 of masking member 15. The distance separating guide plates 59 and 60 is substantially equal to the distance separating mask edges 27 and 28 of masking member 15. Through the cooperation of these edges 27, 28 and plates 59, 60 the path of relative movement between masking member 15 and support structure 50 is established as masking axis 35.

As shown in FIG. 3, the assembled first embodiment converter 10 provides a regulated interrelated relative movement between the three components: masking member 15, impression member 30 and support structure 50.

In order that the proper isometric guide oblique impressions can be transmitted from an orthographic drawing to the impression sensitive member 45, it is necessary that: (1) slit axis 20 is positioned parallel to a selected axis of the orthographic drawing; (2) masking member 15 moves relative to support structure 50 with guide plates 59, 60 cooperating with masked edges 27 and 28 to move slit 19 along masking axis 35 in a direction 90° from the selected axis; (3) carriage guides 23, 24 cooperate with carriage guide edges 32, 33 causing sensitive member 45 to move relative to slit 19 along carriage axis 25 in a direction 240° from slit 19 when masking member 15 moves relative to support structure 50; and (4) guide tongue 36 with its tongue edges 37 and 38 engage tongue guides 55 and 56 of support structure 50 to move impression sensitive member 45 along tongue axis 39 in a direction 165° from the selected axis.

To meet these requirements, the first embodiment converter 10 establishes certain relationships with its components. Assuming in the assembled condition, as shown in FIG. 3, that the selected axis of the orthographic drawing is parallel with slit axis 20, then carriage guide path 25 is established at 240° from the selected axis, tongue axis 39 is established 165° from the selected axis, and guide plates 59, 60 and mask edges 27, 28 extend 90° from the selected axis. As shown, carriage guide edge 23 of guide plate 22 extends at an angle of 30° from the masked edge 27 of the masking member 15 and carriage guide edge 24 extends at an angle 30° to the masked edge 28. In addition, carriage guide edges 32, 33 extend at an angle of 60° from slit axis 20 and tongue edges 37, 38 extend at angles 75° and 105° from carriage guide edges 32, 33. Further, tongue guide edges 55, 56 extend at angles of 75° and 105° from guide plates 59, 60.

For a better understanding of the operation of first embodiment converter 10, reference is directed to FIGS. 4-8. In FIG. 5 a standard three view orthographic engineering drawing 65 is shown illustrating a shed 67 with a front elevation view 68, top plan view 70 and a side elevation view 71. In FIG. 4 the drawing sheet 65 including the orthographic front elevation view 68 of the shed 67 is placed above the transparent slit 19 and may be suitably suspended by means of tacks 73 put in the upper edges of guide plates 59 and 60. By moving the masking member 15 from the floor line 75 to the tip of the roof 78 of shed 67, the oblique projection can be made of the orthographic front elevation view 68 by using a pin or some other suitable impression means and puncturing the orthographic drawing 65 with the pin passing through the slit 19 making a series of impressions on impression surface 46. Initially slit axis 20 is lined up with the selected orthographic axis 80 which in this case is parallel to the floor line 75 of the shed 67. With reference to FIG. 6, there is shown the sequence whereby slit 19 is moved beneath orthographic drawing 68 from floor 75 to tip 78. Individual holes or other impressions 1a to 4a are generated by means of the pin while the slit 19 is in the a position. This process is continued, moving slit 19 incrementally through a series of points to generate all of impression points necessary until finally a tracing can be made joining the various impression points together to produce the oblique print 82. Top plan view 70 of shed 67 is also converted to develop a tracing guide 72 by use of the same technique but with slit axis 20 positioned initially parallel to selected orthographic axis 83. The same procedure is used to form tracing guide 84 from side elevation view 71 with slit axis 20 positioned initially parallel to selected orthographic axis 88.

As seen in FIG. 7, an isometric tracking cube 90 is made by placing tracing guides 72, 82 and 84 on the standard isometric reference lines X, Y and Z. The angle of carrier guide path 25 insures that the points along the shed floor line 75 are generated along the X axis while the shed side wall edge 74, properly foreshortened as line 74′, is placed along the Z axis due to the tongue path 39 angle of 165°. From the tracing cube 90, a draftsman can easily develop the desired isometric drawing 85 shown in FIG. 8.

Figure 10:
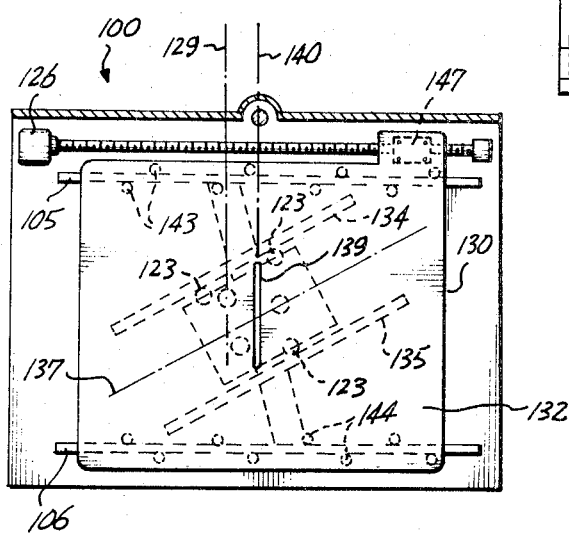
FIG. 10 shows a plan view of the assembled second embodiment converting apparatus with the masking member in place.

While the first embodiment 10 of the orthographic drawing converter is suitable for many situations, it is appropriate to describe a somewhat different design following the same basic principles as in the first embodiment 10, but utilizing a power system and a guiding system having less friction. With reference to FIGS. 9 and 10, the second embodiment converter 100 is described. As shown, the converter 100 includes a support structure 102, an impression member 115 and a masking member 130.

With specific reference to FIG. 9, a plan view of the second embodiment converter 100 is shown with the masking member 130 removed for clarity. Support structure 102 includes a support platform 103 and generally parallel and spaced masked guide plates 105 and 106 which provide a means of establishing a masking path axis 107. In addition, support structure 102 includes a carriage tongue guide 10 having guide edges 109 and 110 for establishing a to8ngue path avis 112. Impression member 115 includes an impression plate 117 with its sensitive surface 118 exposed as it is supported by impression plate carriage 120. Carriage 120 has mounted on it tongue guide rollers 121 which are positioned for engagement with guide edges 109 and 110 of tongue guide 108. Also mounted on carriage 120 are carriage guide rollers 123 spaced for engagement with suitable carriage guiding surfaces on masking member 130. From an assumed orthographic axis 129, it should be noted that masked plates 105 and 106 extend in a direction at an angle of 90° from the orthographic axis 129 and that carriage tongue axis 112 extends in a direction of 165° from the orthographic axis 129. To provide the relative movement along masking member 130, support structure 102 and impression member 115, a drive means 125 is mounted on support plate 103. Drive motor 126 rotates a drive screw 127 which in turn is connected to masking member 130 by masking connector 147, shown in FIG. 10.

Masking member 130 includes plate 132 having generally parallel and spaced apart carriage guide rails 134 and 135 establishing carriage path axis 137 extending at an angle of 240° from the selected orthographic axis 129. An elongated transparent slit 139 is defined in plate 132 having slit axis 140 extending generally parallel to selected orthographic axis 129. To guide the relative movement between masking member 130 and support structure 102, guide rollers 143 and 144 are supported from plate 132 and positioned for guiding support along either side of masked guide plates 105 and 106. To establish the relative movement between impression member 115 and masking member 130 carriage guide rails 134 and 135 are engaged by carriage guide rollers 123.

The operation of a second embodiment converter 100 is quite similar to that of the first embodiment converter 10 in that as masking member 130 moves along axis 107 through the action of drive means 125 impression plate carriage 120 is moved relative to support structure 102 along tongue axis 112 and relative to masking member 130 along carriage path axis 137. An orthographic drawing is transmitted through the transparent slit 139 either by a projection system passing light through the slit 139 onto the sensitive surface 118 or by means of pins or other means projecting through the drawing and slit 139 onto the sensitive surface 118.

Figure 11:
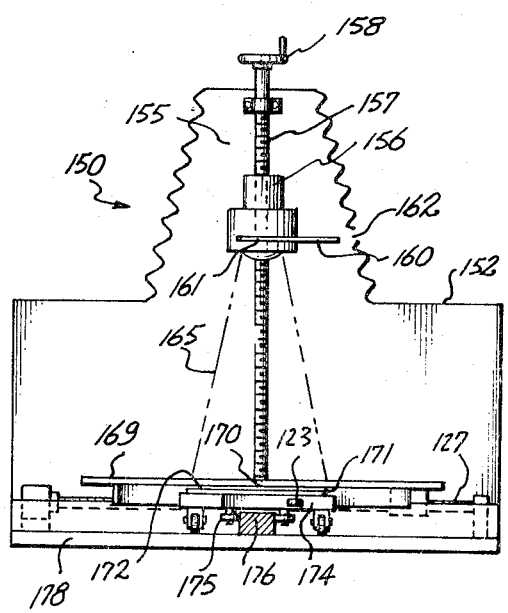
FIG. 11 is a front elevation view of the third embodiment of the converting apparatus made in accordance with the instant invention illustrating its use in producing oblique drawings from microfilms containing orthographic views.

A third embodiment converter 150 is shown in FIG. 11 utilizing converter components similar to the second converter 100 but having, in addition, a light shield cover 152 which permits its use outside of a darkroom. To project the orthographic image onto the light sensitive film surface 172, enlarger 155 is used. It includes a light source 156, a focusing screw 157 and an adjusting handle 158, which positions enlarger 155 relative to the impression member 171, for proper focusing of the orthographic image contained on a microfilm card 160 which is inserted through a card slot 162 in light shield 152 and held in the enlarger by card holder 161. The projected image 165 cannot penetrate through the masking member 169 except at the aperture slit 170 defined in the masking member 169. Just beneath the aperture slit 170 is positioned impression member 171 with its light sensitive film surface 172 adjacent to aperture slit 170. Impression member 171 is supported on a carriage 174 having tongue rollers 175 for guiding its movement along tongue 176 mounted on a support structure 178. Since the operation of a third embodiment 150 is so similar to that of the second embodiment converter 100, further description seems unnecessary.

While the third embodiment converter 150 has been designed primarily for conversion of orthographic drawing which are in the form of films such as microfilms, the fourth and fifth embodiment converters 180 and 235 have been developed for conversion of conventionally rendered orthographic drawing. As shown in FIG. 12, the fourth embodiment converter 180 is used as an accessory for a conventional copy camera 185. The orthographic drawing sheet 65 containing end elevation view 68 is mounted by tape 187 or other suitable means on the mounting board 186 of copy camera 185. A conventional camera lens and focusing unit 188 permits the image of the orthographic drawing view 68 to be focused on the image sensitive film 209 held in film holder 207.

The fourth embodiment converter 180 includes a guide plate 190 which is detachably mounted on focusing unit 188 and defines an aperture 191 through which the drawing image may pass. Channel guide rails 193 are generally parallel to and spaced from one another by attachment to guide plate 190 to establish a carriage axis 194 extending in a direction 165° from the selected orthographic axis 80. While guide plate 190 is common to both the fourth and fifth embodiment converters 180, 235, an anchor hook 196 is secured to plate 190 particularly for use with the fourth embodiment converter 180.

The shutter and film carriage 200 for converter 180 defines a housing 202 having guide lips 203 formed in the housing edges of a size and shape to fit into and slide along channel guide rails 193. The back end of housing 202 includes a film holder 207 which contains light sensitive film 209 upon which the image of orthographic drawing is focused by focusing unit 188.

As best shown in FIG. 13, film carriage 200 contains a masking member 211 positioned between the focusing unit 188 and film 209. Masking member 211 is shown in the form of an opaque sheet material which defines an elongated slit aperture 212 having a slit axis 213 extending parallel to selected orthographic axis 80. Shutter rollers 215, 216 are used to support masking member 211 in a manner that permits slit aperture 212 to move in a long slit path 227 extending in a direction 90° from selected orthographic axis 80. Through the pulling action of roller cord 219 wrapped around shutter roller 216 a portion of masking member 211 is unwound from shutter roller 215 and another portion is accumulated on roller 216.

To provide the proper interrelated relative movement among the carriage 200 with film 209, the projected image of the orthographic drawing 68 and the slit aperture 212, a force F is applied to carriage 200 with any suitable means along the carriage axis 194. With pull ring 205 held by anchor hook 196 force F causes a tension on carriage cord 225 which is fastened to the outside surface of carriage pulley 223. Since carriage pulley 223 is pivotally mounted on pulley axle 222 projecting from carriage 200 and rigidly connected to roller pulley 221, such tension causes these pulleys, 221, 223 to rotate in a clockwise direction. Because roller cord 219 is fastened to the exterior surface of roller pulley 221, such rotation causes cord 219 to unwind from and turn shutter roller 216 as cord 219 winds up on roller pulley 221. The ratio of the circumference of roller pulley 221 to that of carriage pulley 222 is predetermined to insure the proper isometric conversion of the orthographic image 68 as it is impressed upon film 209.

FIG. 14 is presented to aid in the determination of the pulley circumference ratios. It is noted that when the vector 227, representing the actual movement of the slit aperture 212 normal to selected axis 80, is assumed to be equal to one unit of measurement, then the actual carriage movement vector 229 should equal 2 times the sin of 15° or 0.518 of one unit of measurement to provide the proper isometric tracing guide image on film 209. The relationship dictates the ratio of pulley circumferences such that when the carriage pulley 223 unwinds 0.518 inch of carriage cord 225 due to the movement of carriage 200 away from hook 205 along path 194 then roller pulley 221 should accumulate enough of masking member 211 to insure that slit aperture 212 moves along path 227 a distance of 1.000 inch. The exact circumference ratio between the pulleys 221 and 223 is dependent upon the axis of rollers 215 and 216 and is not critical as long as the stated interrelated motion results between carriage 200 and slit aperture 212. Once carriage 200 has reached the end of its travel along path 194 with slit aperture 212 transiting the full orthographic image 68, a return spring (not shown) in roller 215 reverses the travel of masking member 211 and carriage 200.

To provide easy focusing of orthographic image 68 onto film 209 masking member 211 may define a large aperture (not shown) and film holder 207 may have a provision for insertion of a translucent plate in the normal position of film 209.

In operation, the orthographic drawing 65 is secured to mounting board 186 by tapes 187 with selected axis 80 parallel to slit axis 213; as shown, selected axis 80 and slit axis 213 are vertical. Using any conventional means or that described above focusing unit 188 is positioned relative to drawing 65 and the plane of film 209 to insure a sharp image focus on film 209. Once guide plate 190 and carriage 200 are properly installed in copy camera 185 and pull ring 205 is engaged by anchor hook 196, a force F is applied by any suitable means, such as by a screw thread motor (not shown), to move carriage 200 at a speed consistent with the photoghaphic qualities of film 209. As carriage cord 225 unwinds from carriage pulley 223, the rotation of roller pulley 221 through the action of roller cord 219 causes masking member to accumulate on roller 216. This accumulation results in slit aperture 212 moving along path 227 incrementally exposing film 209 to the isometric image of the orthographic view 68. As the cycle is completed, isometric tracing image 82 on film 209 is developed to produce an isometric tracing guide.

Still another embodiment of a suitable isometric converter is the fifth embodiment 235 shown in FIG. 15. Converter 235 utilizes guide plate 190 through which shutter and film carriage 237 are attached to copy camera 185 in a manner similar to converter 180. It should be noted that FIG. 13 shows carriage 200 as it is seen from the film end of copy camera 185 while FIG. 15 shows carriage 237 as it is seen from the focusing unit 188. Shutter and film carriage 237 includes housing 239 having parallel guide lips 241 which are formed and spaced to fit into and slide along channel guide rails 193 of guide plate 190 shown in FIG. 12. Housing 239 also includes a film holder 243 for supporting film 244 adjacent to opaque masking member 245. A slit aperture 246 having a slit axis 247 parallel to selected axis 80 is defined in masking member 245. Shutter rollers 249, 250 provide support for masking member 245 and are each supported by housing 239.

To provide the desired distortion in the image imprinted on film 244 as it is incrementally exposed to the image of orthographic drawing 65 by slit aperture 246, carriage 237 is suspended between upper guide plate anchor 259 and lower guide plate anchor 268, both of which are secured to guide plate 190. Upper carriage cord 258 is fastened at one end to upper anchor 259 and at the other end to upper carriage pulley 256. Since pulley 256 rotates about pulley axle 255, projecting from housing 239, and is fixedly attached to upper roller pulley 254, any rotation of pulley 256 causes an equal rotation of pulley 254. Since upper roller cord 252 is wrapped at one end around roller 249 and fastened at the other end to the circumference of upper roller pulley 254, clockwise rotation of pulley 254 causes masking member 245 to unwind from roller 250 and slit aperture 246 to move along path 276 normal to slit axis 247 and selected axis 80. One end of lower roller cord 262 is wrapped around and fastened to roller 250 with the other end fastened to the circumference of lower roller pulley 263. Pulley axle 264 projecting from housing 239 supports pulley 263 and lower carriage pulley 265 which is fixedly secured to pulley 263. Lower carriage cord 267 is fastened at one end to the circumference of pulley 265 and at the other end to tension spring 269 which is secured to lower plate anchor 268. To drive masking member 245 and carriage 237 a reversible drive motor 270 is mounted in housing 239, having energy leads 271 and a drive pulley 273. Drive cord 274 extends between drive pulley 273 and pulley 263 to drive pulleys 263 and 265.

The same interrelated relative movement among the projected image, slit aperature, and film carriage described with reference to the fourth embodiment converter 180 is required in the fifth embodiment converter 235. To obtain this movement the circumference ratios between the roller and carriage pulleys 254:256 and 263:265 are selected to provide the movement of film 244 along carriage path 277, 165° from selected axis 80, 0.518 inch during the same time that slit aperture 246 moves along slit path 276, 90° from selected axis 80, 1.000 inch. The speed of drive motor 270 is selected to provide the proper photographic exposure of film 244 while slit aperture 246 transits the image of orthographic image 68.

It should be noted that the so-called slit defined in the masking member need not be an aperture in the converters using light sensitive film as the impression member as long as the slit is transparent. It should be clear that normal photo processing steps ca nbe used to develop, reduce or enlarge the oblique images made on the light sensitive members as needed.

Thus, there has been provided a significantly simplified apparatus for converting ordinary engineering orothgraphic drawings to oblique impressions which can be used as tracing guides for isometric drawings. The angular relationships among the selected orthographic drawing axis and the predetermined interrelated relative movement of the converter's components assure the proper distortion of the oblique print.

What is claimed is:
1. A means for converting an orthographic drawing image into an isometric tracing guide comprising:
   a masking member defining an elongated aperture slit extending parallel to a first direction;
   an image sensitive member supported by a carriage and positioned adjacent to said apertured slit;
   interlocking means engaging said masking member and said carriage for guiding said slit in a second direction extending 90° from said first direction and for guiding said sensitive member in a path extending in a third direction 165° from said first direction responsive to the movement of said slit in said second direction with said carriage having a movement relative to said slit in a fourth direction extending 240° relative to said slit; there being
   a pair of parallel mask guide means defined by said masking means and extending in said second direction;
   a pair of parallel support guide means held fixed in relation to said projected image but extending in said second direction and spaced apart a distance substantially equal to the distance between said mask guide means to guide along and engage said mask guide means;
   a pair of parallel masking guide means defined by said masking means and extending in said fourth direction;
   a pair of generally parallel carriage guide means defined by said carriage extending in said fourth direction and spaced apart a distance substantially equal to the distance between said masking guide means to guide along and engage said masking guide means;
   a support member having means defining a tongue guide means extending in said third direction; and
   a tongue means defined by said carriage and formed to engage and guide along said tongue guide means for guiding the movement of said sensitive member relative to said support member.
2. The apparatus of claim 1 including:
   support member having two parallel spaced apart support guide means extending in said second direction for guiding said masking member;
   said masking member having two parallel mask guide means extending in said second direction and spaced apart a distance substantially equal to the distance between said support guide means for engagement with said support guide means.
3. The apparatus of claim 1 including:
   a support member having means defining a tongue guide means extending in said third direction;
   said carriage including a tongue means formed to engage and guide along said tongue guide for guiding the movement of said sensitive member relative to said support member.
4. The apparatus of claim 1 wherein:
   said masking member includes two parallel spaced apart masking guide means defining a carriage path extending in said fourth direction;
   said carriage includes generally parallel carriage guide means extending in said fourth direction and spaced from one another a distance substantially equal to the separation between said masking guide means for guiding the movement of said carriage relative to said slit aperture.
5. The apparatus of claim 1 including:
   means for projecting said orthographic image through said aperture slit with a selected axis of said image positioned parallel to said first direction.
6. The apparatus of claim 5 wherein:
   said projecting means includes a film holder, a light source and a focusing means;
   said film holder having means for holding a film having an orthographic image; and
   said focusing and light source means being adjustable for focusing and projecting said image onto said sensitive member.
7. The apparatus of claim 5 wherein:
   said projecting means includes a mounting board for supporting said orthographic drawing, and a focusing means for focusing said image onto said sensitive member.
8. The apparatus of claim 1 including:
   means for moving said masking member.
9. The apparatus of claim 8 wherein:
   said moving means includes a motor means operatively connected to said masking member.
10. The apparatus of claim 1 wherein:
    said masking member is in sheet form and supported by two rollers.
11. A means for converting an orthographic drawing image into an isometric tracing guide comprising:
    a masking member defining an elongated aperture slit extending parallel to a first direction;

an image sensitive member supported by a carriage and positioned adjacent to said aperture slit;

interlocking means engaging said masking member and said carriage for guiding said slit in a second direction extending 90° from said first direction and for guiding said sensitive member in a path extending in a third direction 165° from said first direction responsive to the movement of said slit in said second direction with said carriage having a movement relative to said slit in a fourth direction extending 240° relative to said slit; there being means for projecting said orthographic image through said aperture slit with a selected axis of said image positioned parallel to said first direction, comprising an impression making member which is extended through said slit making an impression on said sensitive member.

12. A means for converting an orthographic drawing image into an isometric tracing guide comprising:

a masking member defining an elongated aperture slit extending parallel to a first direction;

an image sensitive member supported by a carriage and positioned adjacent to said apertured slit;

interlocking means engaging said masking member and said carriage for guiding said slit in a second direction extending 90° from said first direction and for guiding said sensitive member in a path extending in a third direction 165° from said first direction responsive to the movement of said slit in said second direction with said carriage having a movement relative to said slit in a fourth direction extending 240° relative to said slit;

said masking member being in sheet form and supported by two rollers;

roller drive means for accumulating one portion of said masking member on one of said rollers while an equal portion of said masking member is unrolled from the other of said rollers;

means establishing a path for said carriage in said third direction; and carriage drive means interlocked with said roller drive means with a predetermined relationship established for the movement of said aperture slit along said second direction a distance of one unit due to said masking member roller movement results in a movement of said carriage and sensitive member along said third direction a distance substantially equal to 0.518 unit.

13. The apparatus of claim 12 including:

a drive motor mounted in said carriage and drivingly connected to said carriage and roller drive means.

14. The apparatus of claim 12 including:

a mounting means for supporting said orthographic drawing image positioned with a selected axis parallel to said first direction;

a focusing means positioned between said drawing and sensitive member for focusing said image onto said member through said aperture slit.

15. An apparatus for generating an isometric guide image from an orthographic image comprising:

masking member, impression member, support structure, and guide means in combination;

said masking member defining a narrow image transmitting slit extending in a first direction;

said impression member including an image sensitive medium and a carriage member for supporting said medium;

said support structure including supporting elements for positioning said image sensitive surface in registry with said slit;

said guide means including first, second and third guide systems;

said first guide system including cooperative engagement between elements of said masking and supporting structure for establishing a first guide path for said slit in a second direction 90° from said first direction;

said second guide system including cooperative engagement between elements of said carriage member and said support structure for establishing a third guide path for said sensitive surface relative to said support structure in a third direction 165° from said first direction; and said third guide system including cooperative engagement between elements of said masking and carriage members for establishing a second guide path for said sensitive surface relative to said slit in a fourth direction 240° from said first direction.

References Cited

UNITED STATES PATENTS

| | | | |
|---|---|---|---|
| 3,374,724 | 3/1968 | Torres | 355—52X |
| 3,401,616 | 9/1968 | Cross | 355—52X |

JOHN M. HORAN, Primary Examiner

R. A. WINTERCORN, Assistant Examiner

U.S. Cl. X.R.

355—99